Patented Apr. 11, 1950

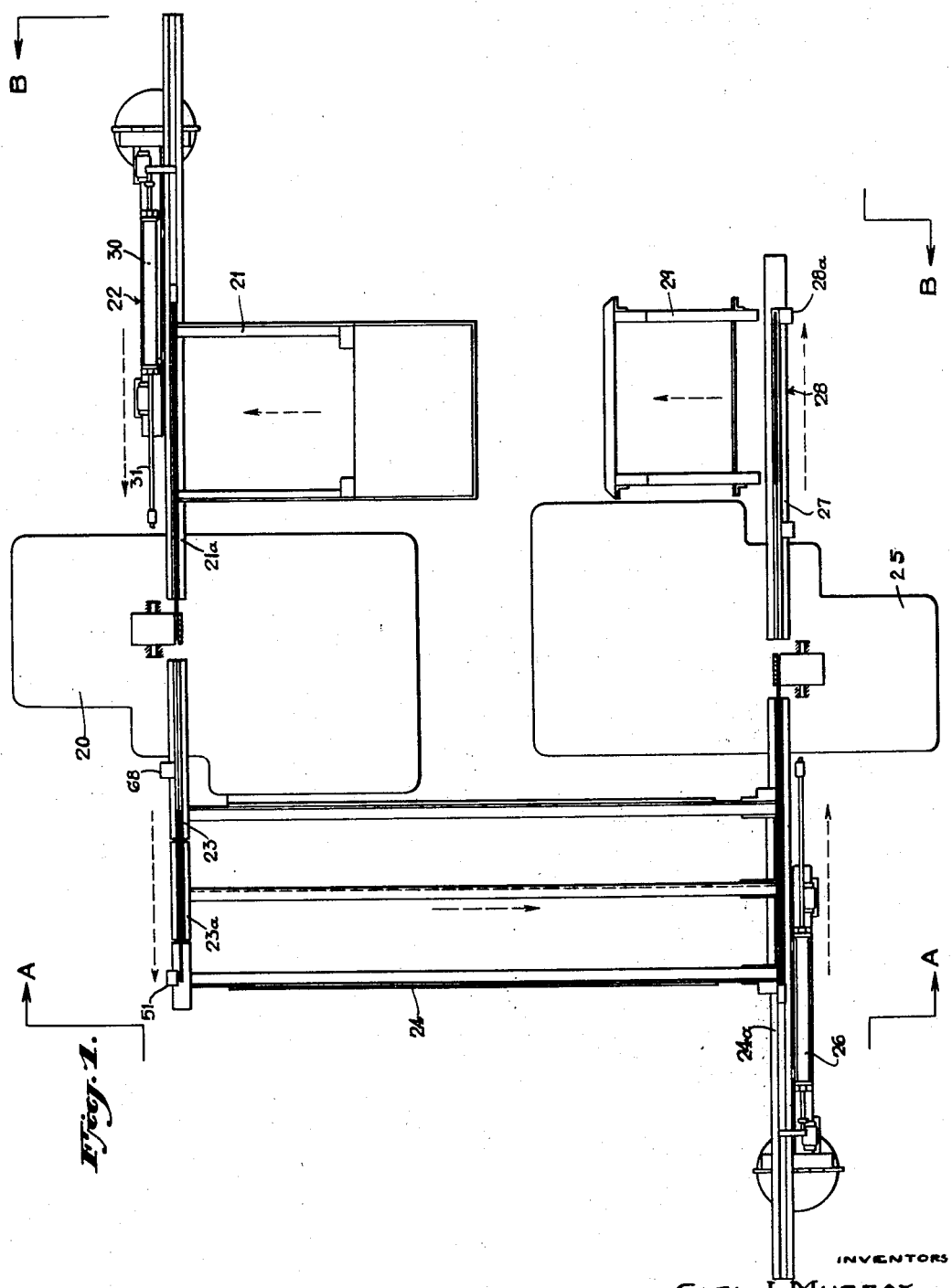

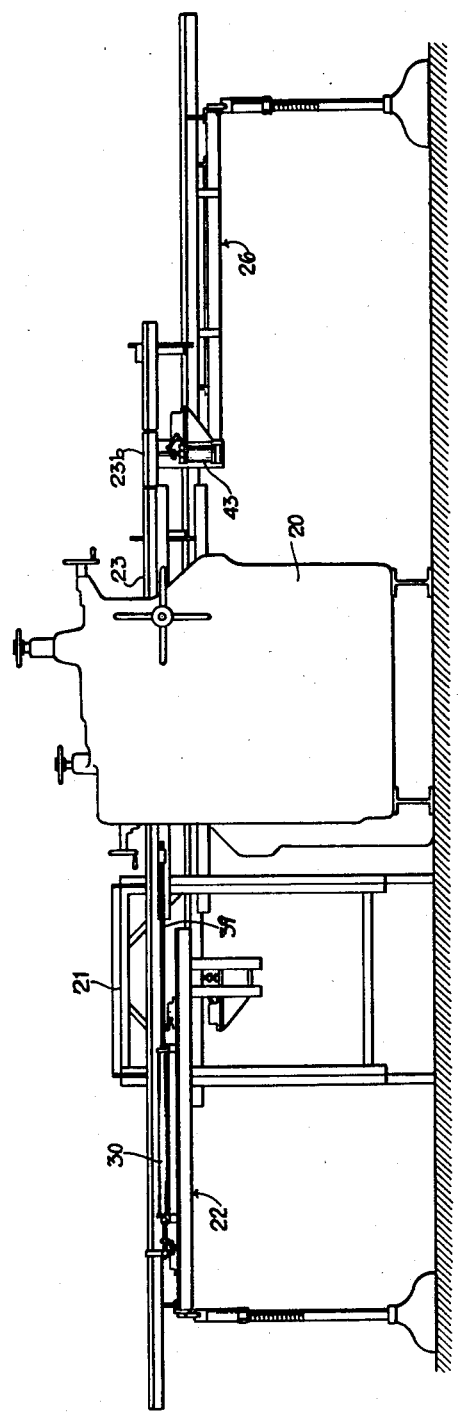

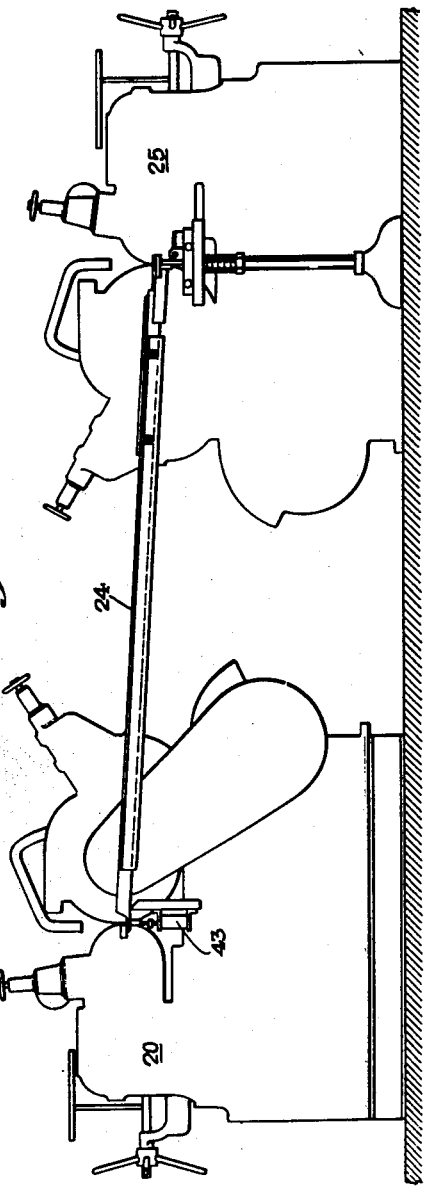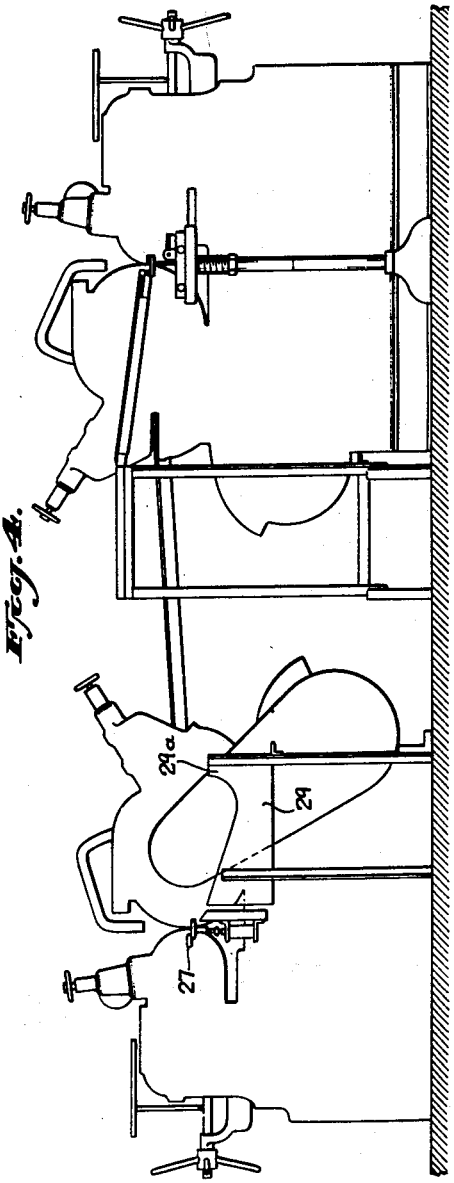

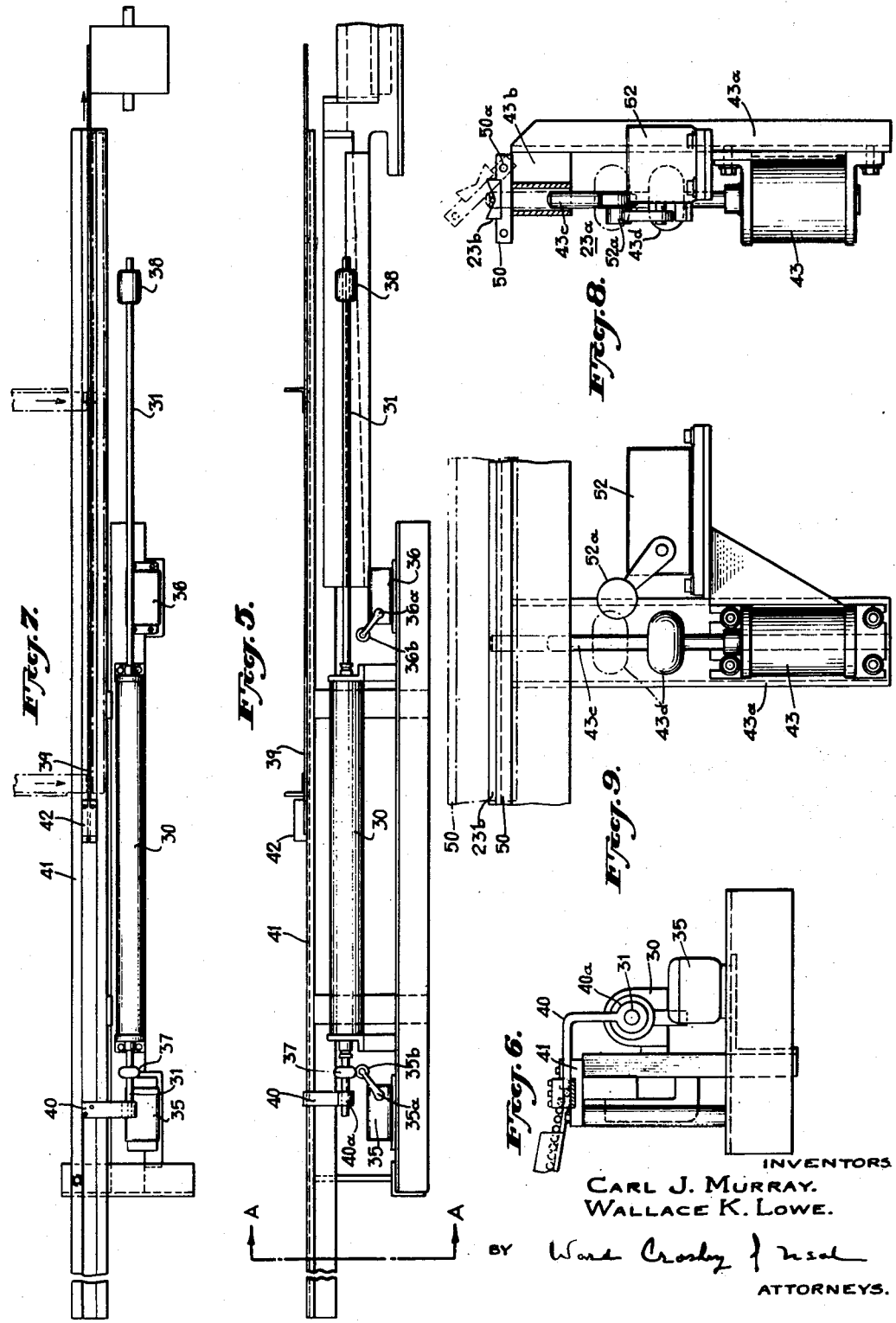

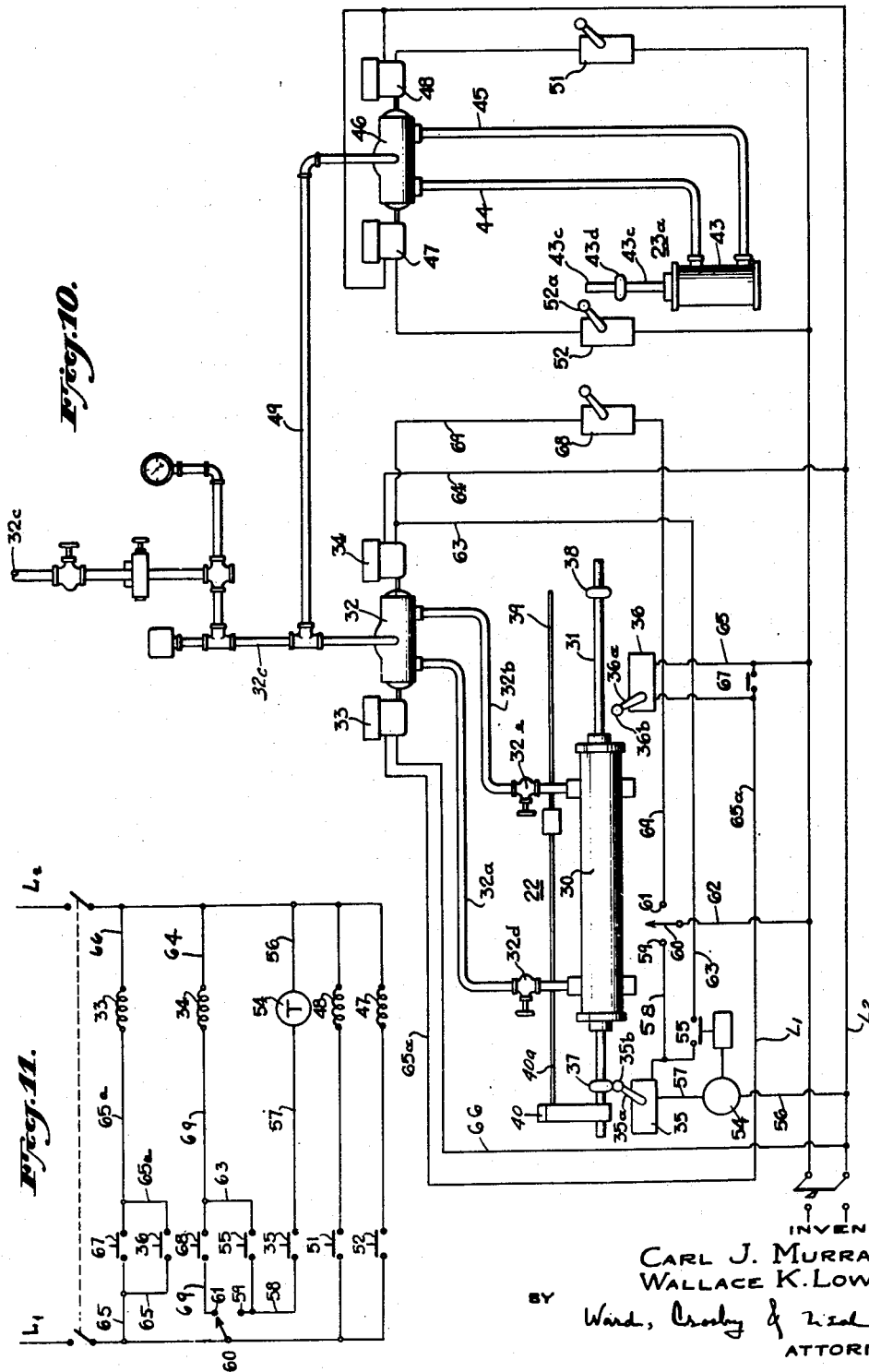

2,503,761

UNITED STATES PATENT OFFICE 2,503,761

AUTOMATIC FEEDING DEVICE AND CONTROL MEANS THEREFOR

Carl J. Murray, Liverpool, and Wallace K. Lowe, Syracuse, N. Y., assignors to Crucible Steel Company of America, New York, N. Y., a corporation of New Jersey Application August 18, 1947, Serial No. 769,114

14 Claims. (Cl. 51—103)

The invention relates to apparatus for consecutively and automatically feeding objects from a group thereof into operative engagement with apparatus for performing a manufacturing or fabricating operation thereupon, and more particularly to means for automatically feeding objects successively to a series of such apparatus which are coupled together. The invention also relates to means for controlling the timing of the feed of such objects to such apparatus.

This application is a continuation-in-part of our co-pending United States application S. N. 721,930 filed January 14, 1947.

In the mass production of certain types of objects which are to undergo certain repetitive fabricating operations, it is desirable to hold a plurality of such objects within suitable retaining means such as a tray or rack and consecutively to discharge said objects therefrom into operative engagement with the apparatus which is to perform the fabricating operation thereupon. An example of this procedure is found in the manufacture of cylindrical objects, such as metal rods from bar stock, wherein it is desired to grind and polish same.

In our above-mentioned patent application, we disclose apparatus for automatically and consecutively feeding rods into engagement with a single grinding and polishing device. It is highly desirable, however, to provide means for connecting at least two of said devices in series wherein, for example, one type of operation is performed by the first, and a second type of operation performed by the second device. Thus the product of the first device is automatically fed to the second device. The number of machines which an operator can supervise thus is doubled.

With respect to the timing of the reciprocating means for automatically feeding the objects to the apparatus which is to act thereupon, the above-mentioned patent application discloses means for timing successive reciprocations by means of regulation of speed control valves which are interposed in the pipe lines to a power cylinder. We have found that this particular type of speed control is not adapted for giving desired results when, for example, exceptionally long rods are being ground by the grinding rolls or where the grinding is slow, as in the case of large diameter rods or bars. In certain instances it is desired to interpose a time delay between the completion of one stroke and the initiation of the next. The apparatus disclosed in said application cannot accomplish these results.

According to the present invention, apparatus are provided for overcoming the above difficulties.

Various, further and more specific features and advantages of the invention will clearly appear from the detailed description given below taken in connection with the accompanying drawings which form a part of the specification and illustrate by way of example preferred arrangements of apparatus for carrying out the invention. The invention consists of such novel combinations and features of apparatus as may be shown and described in connection with the equipment herein disclosed.

In the drawings:

Fig. 1 is a plan view of one embodiment of the invention;

Fig. 2 is a side elevation of the apparatus illustrated in Fig. 1;

Fig. 3 is a view taken along line A—A of Fig. 1;

Fig. 4 is a view taken along line B—B of Fig. 1;

Fig. 5 is a detailed view in side elevation of a reciprocating plunger and certain associated apparatus for urging cylindrical rods into engagement with a grinding device;

Fig. 6 is a sectional view taken along line A—A of Fig. 5;

Fig. 7 is a plan view of the parts shown in Fig. 5;

Fig. 8 is a side elevation in detail showing means for ejecting a rod from a support onto a rack;

Fig. 9 is a front elevation of the parts shown in Fig. 8;

Fig. 10 is a schematic representation of the reciprocating plunger device employed in the present invention in combination with means for controlling the timing of the plunger strokes, and also in combination with the ejector device shown in Fig. 8; and Fig. 11 is a schematic wiring diagram for the apparatus shown in Fig. 10.

Novel means are disclosed herein for operating in tandem two apparatus such as a rough grinding machine for cylindrical rods and a fine or finish grinding machine whereby the sole manual operation required is the loading of an input rack of the first machine. Said novel means comprise an input rack or tray in which the rods are retained and directed toward a discharge position therein from whence a reciprocating plunger consecutively urges the rods into engagement with the rough grinding machine. The rack or tray has at least a portion thereof tilted to cause the rods to be urged by gravity toward the lowermost or discharge position. After each rod has undergone the first operation by the rough grinding machine, it is discharged onto a discharge guide member from which it is ejected by suitable means onto another tilted rack comprising a transfer table or transfer rack. Each rod rolls towards the bottom of this transfer rack into a discharge position from which it is ejected by a second reciprocating plunger device and is fed to the second machine (finish grinding machine). Each rod is discharged from the latter machine onto another discharge guide member and an ejector moves same onto a tilted storage tray or rack down which the rods roll toward the bottom thereof.

Means are provided for interposing a delay between successive strokes of the reciprocating plunger whereby desired stroke timing is attained for the feeding, for example, of long bars or sections of bar stock of large diameter. Also means are provided for controlling the timing of strokes of the plunger in response to the position of a rod that is undergoing a fabricating operation, such as the above-mentioned grinding operation. That is, instead of governing the timing of the strokes by speed control valves interposed in the pipe lines of the plunger cylinder (as shown in our co-pending application above identified), each successive stroke of the plunger can be initiated in response to the position of the object being acted upon with respect to the above-mentioned rack for holding same, or with respect to the grinding apparatus. When bars or rods are fed manually to the grinder, the lapse of time between the finishing of one bar and the feeding of the next is subject to the whim of the operator, whereas when the rods are fed automatically, a uniform rate is attained with a minimum delay therebetween.

Coupling of two or more centerless grinders

Referring to the drawings in further detail, Fig. 1 illustrates the coupling of two centerless grinders. The first centerless grinder unit comprises in general a grinding and polishing device 20; a rack or tray mechanism 21 for holding a plurality of rods in readiness to be fed successively into the grinder; an automatic reciprocating mechanism 22 for thrusting said rods one at a time into operative engagement with the grinder; a discharge guide member 23 for receiving the rods as they are consecutively discharged from the grinder; and an ejector mechanism 23a to be described hereinafter. The ejector mechanism is adapted for urging each rod out of the discharge guide member 23 and into a tilted transfer rack or table 24 which constitutes an input rack for a second centerless grinder 25 which performs, for example, a finish grinding operation upon each rod. The transfer rack 24 is analogous to the rack 21. At the lower extremity of rack 24 a suitable discharge position is assumed consecutively by each rod and each is fed to the grinder 25 by means of a reciprocating plunger device 26 which is analogous to the reciprocating mechanism 22. A discharge guide member 27 is associated with the discharge side of the grinder 25 for receiving the rods when discharged; and an ejector 28, analogous to ejector 23a, is associated with the discharge member 27 for moving each rod into a storage rack or tray 29. The latter is tilted downwardly from member 27 as shown in Fig. 4. The storage rack is provided with an upwardly curved retaining surface 29a which facilitates the accumulation of rods therein. The second grinder unit thus consists in the transfer rack 24; the reciprocating feed device 26; the grinder 25; the discharge guide member 27; the ejector 28; and the storage tray 29.

In the above-described embodiment of the invention, the product of the first grinding machine is automatically fed to the second machine with the assistance of gravity. Furthermore, gravity is employed to urge the rods toward a discharge position in both the input rack 21 and the transfer rack 24. However, it is to be understood that other suitable means can be employed for so urging the objects or rods toward a discharge position.

The centerless grinders 20 and 25 in general are of the same type as described in our co-pending application S. N. 721,930 mentioned above.

It will be noted (Fig. 3) that the centerless grinder 20 is elevated slightly above the level of grinder 25 in order to permit the tilting of the transfer table 24 whereby the rods or bars will roll toward the right, as viewed in said Fig. 3.

At the lower extremity of the input rack 21, a guide rail 21a is provided which is adapted for guiding a rod from the lowermost or discharge position in the rack up to the grinding roll of the machine 20. The action of the grinding machine is adapted to urge the rod in the direction of its initial axial movement as caused by the reciprocating plunger device 22.

An analogous guide rail 24a is provided at the lowermost extremity of the transfer rack 24 and is adapted for guiding a rod moved by the reciprocating mechanism 26 up to the grinding roll of the second grinding machine 25.

Reciprocating mechanism

The reciprocating mechanisms 22 and 26 are similar. Only the former will be described. It is illustrated in Figs. 5, 6, 7 and 10 and comprises a power cylinder 30 having therein a suitable piston mounted upon a rod or plunger 31. This piston and plunger, of course, can be actuated by any suitable pressure medium and in the form shown air is employed.

The means for controlling air pressure to cylinder 30 and thus for reciprocating the piston rod comprise a main or master control valve 32 (Fig. 10) and electrically operable solenoid bleeder valves 33 and 34. Master control valve 32 is connected to the power cylinder by conduits 32a, 32b.

Air under pressure is fed to the main control valve 32 through a conduit 32c which has connected thereto a conventional gate valve, pressure regulator, gauge and lubricator.

The construction of the power cylinder 30 and its plunger 31, the main control valve 32 and its electrically operable bleeder valves 33 and 34 are similar in construction to the analogous parts in our co-pending application above identified, namely, power cylinder 55, main control valve 57 and electrically operable valves 109 and 110 (Fig. 10 of S. N. 721,930).

As shown in Fig. 5, the plunger or piston rod 31 projects through both cylinder heads of the power cylinder 30. A pair of limit switches 35 and 36 are mounted adjacent the left and right hand extremities of the power cylinder 30 and are adapted, in a manner to appear more fully hereinafter, to assist in controlling the reciprocations of the plunger 31. The switches 35 and 36, respectively, have mounted thereupon conventional switch arms 35a and 36a, to which are attached rollers 35b and 36b, respectively. The switch arms 35a and 36a are actuatable respectively by balls 37 and 38 mounted respectively upon the left and right extremities of the plunger 31 as viewed in Fig. 5.

The advance or feed stroke motion of the plunger 31 is communicated to the rods, which are within the rack 21, by means of a pusher rod 39 which is connected to the plunger 31 by means of an L-shaped arm 40 (Fig. 6) which is attached at 40a (Fig. 5) to said plunger at the left extremity thereof. The upper portion of the L-shaped rod 40 moves along the face of a guide rail 41. And the arm 40 is interconnected to a push rod holder block 42 by a suitable arm 40a.

The guide rail 41, as shown in Figs. 5, 6 and 7, is in alignment with the above-mentioned guide rail 21a (Fig. 1) and the pusher rod 39 is adapted for engaging a rod in the discharge position in rack 21 and urging same axially along the guide rail 21a in response to the advance or feed stroke of the plunger 31.

The ejector mechanism 23a (for moving a rod from the discharge guide member 23 onto the transfer rack 24) is shown in Fig. 8 and partially in Fig. 10 and comprises a power cylinder 43 connected by conduits 44 and 45 with an ejector master control valve 46 having electrically operated solenoid bleeder valves 47 and 48. Fluid under pressure is fed to the master control valve 46 by a main conduit 49 which is in communication with conduit 32c. The master control valve 46 and its bleeder valves are respectively analogous in construction to main control valve 32 and its bleeder valves. As shown in Fig. 8, the power cylinder 43 is mounted upon a suitable vertical support 43a having a bracket 43b secured thereto above the cylinder. An arm 50 is pivotally mounted to the bracket 43b at 50a. A section 23b of the discharge guide member 23 is mounted upon the arm 50 and is adapted for being angularly shifted to the position shown in dotted lines in Fig. 8 whereby a rod resting in said section is dumped into the transfer rack 24.

The power cylinder 43 is actuatable by means of limit switches 51 (Figs. 1 and 10) and 52. Switch 51 is contactable by the forward end of a rod when it is discharged completely from the centerless grinder 20, thereby energizing bleeder valve 48. A piston rod 43c of the power cylinder thus is thrust upwardly as viewed in Figs. 8 and 10 to tilt arm 50 and to dump the contents of the section 23b. A ball 43d mounted on rod 43c is adapted for contacting a roller 52a connected to limit switch 52 for initiating the return stroke of the said rod.

The ejector mechanism 28 is analogous in construction and operation to ejector 23a. An ejector limit switch 28a is shown schematically in Fig. 1 which corresponds to limit switch 51.

*Timing of pusher rod strokes*

As above mentioned, it is desirable to govern the timing of successive pusher rod strokes to suit the length of the bars being ground. Therefore, when grinding long rods it is desirable to interpose a delay between successive feed strokes of the plunger 31 in order to give the grinding machine sufficient time to complete its action thereupon prior to the introduction of the next successive rod. This can be accomplished in either one of two ways, namely, (1) the use of a timing device for delaying the return stroke of the plunger 31 (and hence of the pusher rod 39); and (2) by means of a limit switch which is placed in the path of the advancing rod in such a manner that said switch is actuated, for example, as shown after the rod has cleared or has passed out of the feed magazine or input tray 21. Or, if desired said limit switch can be placed in such a position that it will be actuated after completion of the action of the grinding machine upon the rod.

The structure employing the time delay apparatus, and also a limit switch positioned as above and alternatively connectable to the apparatus, is illustrated in Fig. 10.

The structure for delaying the return stroke of the plunger 31 comprises means for delaying the actuation of the bleeder valve 34 by a predetermined time after the plunger 31 has reached its righthand limit of motion as viewed in Fig. 10. This structure comprises an electric timer 54 which can be adjusted to a desired time delay. The timer 54 is actuatable by the limit switch 35 and is operatively connected to a switch 55, which is normally open, but is closable by the timer after the expiration of the preselected delay. The timer 54 is connected by means of a lead 56 to a power lead L2, and by means of a lead 57 to the limit switch 35 (Figs. 10, 11). The latter switch, by a lead 58, is connected to a terminal 59 of a switch 60 which can be placed in contact either with said terminal 59 or with a second terminal 61, for a purpose to appear hereinafter. The movable arm of the switch 60 is connectable by a lead 62 to a second power lead L1. Thus, when the limit switch 35 is closed, there is a flow of electric energy from L2 through the timer 54, the limit switch 35, and to the power lead L1 through the switch 60 provided the latter is connected to the terminal 59.

An electrical circuit from L1 through the solenoid operated bleeder valve 34 will be completed to the power lead L2 when the switch 55 is closed by timer 54 after the expiration of said preselected delay. The bleeder valve 34 is connected to the lead 58 by means of an electrical conduit 63 (in which switch 55 is interposed) and is connected to the power lead L2 by a conduit 64.

The opposite limit switch 36 is adapted for controlling the opposite bleeder valve 33. The electrical circuit therefor consists of: a lead 65 from the power lead L1 to one side of the limit switch 36 (Fig. 10), a lead 65a interconnecting the other side of said limit switch to one of the terminals of the solenoid operated bleeder valve 33, and a lead 66 interconnecting the other side of the solenoid bleeder valve to the power lead L2.

A manually operable normally open switch 67, controlled as by a push button, is connected across the limit switch 36 and is adapted for initiating manually the advance or feed stroke of the plunger 31.

The operation of the apparatus employing the timer 54 is as follows: the switch 60 is placed in contact with the terminal 59, and when the first bar assumes a discharge position at the bottom of the input rack 21 it enters the guide rail 21a, and the operator presses the push button switch 67. This causes the pusher rod 39 to advance by virtue of the energization of the bleeder valve 33. Thus said bar is fed to the grinder rolls of machine 20. When the ball 37 of the plunger closes the limit switch 35, the timer motor winding is energized and the delay interval commences. When this interval has expired, the timer closes the switch 55, and thus closes the circuit of the solenoid bleeder valve 34, thereby retracting the pusher rod 39. The delay for which the timer is adjusted is of sufficient length to permit the rod being ground to pass beyond or clear of the input tray or magazine 21. Thus, when the pusher rod 39 has been retracted by the retraction of the plunger 31, the next successive rod assumes a discharge position and enters the guide rail 21a. When the pusher rod is fully retracted, the ball 38 on the plunger 31 engages the roller 36b of the limit switch 36 closing same. This energizes the solenoid of the valve 33 and initiates another advance or feed stroke. Thus the next successive rod is fed to the grinding rolls. This sequence of steps is repeated continuously. Of course, the push button switch 67 is used in order to advance the first bar or rod and thereafter the cycle is automatically repeated.

When said first rod has been ground, its front end engages the roller of the limit switch 51 which energizes the solenoid bleeder valve 48 of the control valve 46. This applies air under pressure to the ejector cylinder 43, via conduit 45, whereby said bar is dumped out of the discharge support member 23 onto the transfer table or rack 24. When ball 43d on the piston rod 43c engages the roller of limit switch 52, the bleeder valve 47 is energized and the piston 43c is retracted and the tiltable section 23b reverts to its original position ready to receive the next bar.

Instead of controlling the return stroke of the plunger 31 by means of a timer as above described, it is possible to control said stroke in response to the position of a rod or bar which is being advanced. Such a control of the return stroke of the plunger 31 is accomplished by controlling the energization of the bleeder valve 34 by means of a limit switch 68 positioned, for example, as shown in Fig. 1 in such a location that it is engageable by the forward end of a bar at the moment that the rear end thereof has cleared the input rack 21.

The electrical circuit for the limit switch 68 is shown in Figs. 10 and 11 and consists of the lead 62, the switch 60 (which is placed in contact with the terminal 61), a lead 69 connected to one side of said bleeder valve 34, and said lead 64. The limit switch 68 is interposed in the lead 69.

The operation of the apparatus shown in Fig. 10 employing the limit switch 68 is as follows:

A first bar enters the guide rail 21a from the input rack 21 whereupon the operator closes the switch 67. This energizes the solenoid bleeder valve 33 of the main control valve 32, thereby initiating the advance stroke of the pusher rod 39. Said bar thus is fed to the grinder rolls of the grinder 20. When the forward end of the rod reaches and closes the limit switch 68, the solenoid bleeder valve 34 is energized thereby initiating the return stroke of the plunger 31. Just short of the completion of the return stroke the next successive bar assumes a discharge position and enters the guide rail 21a whereupon the ball 38 upon the plunger 31 engages the limit switch 36 and energizes the solenoid bleeder valve 33. This initiates the advance stroke of the plunger. This sequence of steps is repeated automatically as long as rods remain in the input rack.

As above mentioned, the main control valve 32 is connected to the power cylinder 30 by means of conduits 32a and 32b. Speed control valves 32d and 32e are respectively interposed in said conduits 32a and 32b. A certain degree of speed regulation can be had by adjustment of these valves as described in said co-pending application S. N. 721,930. Speed control valves 32d and 32e are preferably similar in construction to that illustrated in Fig. 9 of said co-pending application.

When it is desired to govern the timing of the plunger strokes by the speed control valves 32d and 32e, the switch 60 is placed in contact with the terminal 59 and the timer is adjusted for a zero delay. Thus a desired timing is obtainable solely by the control of the speed of the plunger 31.

The timing means illustrated in Fig. 10 has been described in connection with the grinder machine 20. Of course, analogous structure is employed for controlling the strokes of the reciprocating mechanism 26 used in connection with the grinder 25.

Although the novel feeding apparatus has been described in connection with centerless grinders, it is possible to employ same with other types of devices for performing manufacturing or fabricating operations upon the objects being fed thereto.

While the invention has been described with respect to certain preferred embodiments, it will be understood by those skilled in the art that various changes and modifications may be made without departing from the spirit and scope of the invention, and it is intended therefore in the appended claims to cover all such changes and modifications.

What is claimed is:

1. In apparatus of the class described, the combination comprising: an input rack for holding objects to be fed consecutively to a device for performing a manufacturing operation thereupon, said rack being tilted to permit said objects to be urged by gravity toward a discharge position upon said rack, a device for performing a manufacturing operation upon said objects, an engine having a reciprocable plunger, means operatively connected to said plunger for engaging said objects consecutively and urging same into engagement with said device, a limit switch for governing the feed stroke of said plunger, a limit switch for initiating the return stroke of said plunger, said last-named limit switch being positioned whereby the forward extremity of one of said objects will strike same at the same time that the rear extremity of said object has cleared said input rack.

2. In apparatus of the class described, the combination comprising: an input rack for holding objects; a device for performing a manufacturing operation upon said objects; mechanism for feeding seriatim said objects to said device from said rack; said mechanism comprising a reciprocable plunger apparatus, including a plunger having means operatively connected thereto for engaging said objects consecutively and urging same into said device; mechanism for controlling the reciprocation of said plunger comprising a device for initiating the forward stroke thereof in response to completion of the return stroke thereof, and a device for initiating the return stroke of said plunger in response to the movement of the object being fed to said device out of said input rack.

3. In apparatus of the class described, the combination comprising: an input rack for holding objects to be fed consecutively to a device for performing a manufacturing operation thereupon, a reciprocating plunger mechanism adapted for engaging said objects consecutively and urging same into engagement with said device, mechanism for initiating the forward stroke and the return stroke of said plunger, the mechanism for initiating the forward stroke of said plunger comprising means responsive to the completion of the return stroke, said mechanism for initiating the return stroke being responsive to the movement of the object being acted upon clear of said input rack, a discharge guide member associated with said device for receiving objects discharged therefrom, a tray located adjacent said discharge guide member and an ejector device for moving objects from said discharge guide member into said tray, and means for actuating said ejector in response to one of said objects moving to the extremity of said discharge guide member.

4. In apparatus for automatically feeding sections of elongated stock of a preselected length along a stationary guide, comprising in combination with said guide: means including a magazine for successively delivering sections of said stock onto said guide; a fluid pressure actuated, reciprocative piston device for feeding said sections longitudinally along said guide by successive feed strokes; a fluid pressure actuated control valve, including a reciprocative valve element, for supplying fluid under pressure to said piston device; valve actuating means responsive to preselected reciprocative displacements of said piston device for reciprocatively actuating said control valve, thereby reciprocatively to actuate said piston device; and a timer actuatable by a predetermined reciprocative displacement of said piston device and operatively connected to said valve actuating means for delaying the operation of said control valve by a predetermined period between each feed stroke of said piston device.

5. In apparatus of the class described the combination comprising: a magazine for holding sections of elongated stock to be fed consecutively to a device for performing a manufacturing operation thereupon, a piston device having a reciprocative plunger positioned for engaging said objects consecutively and urging same by successive feed strokes into operative engagement with said device, piston device actuating means responsive to preselected reciprocative displacements of the plunger for reciprocatively actuating the latter, and a timing device actuatable by the plunger and operatively associated with said piston device actuating means for delaying the operation thereof for a preselected period between successive feed strokes of the plunger.

6. In apparatus of the class described, the combination comprising: a magazine for holding sections of elongated stock to be fed consecutively to a device for performing a manufacturing operation thereupon; a piston device having a reciprocative plunger positioned for engaging said objects consecutively and urging same into operative engagement with said device; piston device actuating means responsive to preselected reciprocative displacements of said plunger for reciprocatively actuating said plunger; and a timer device, operatively connected to said piston device actuating means and actuatable in response to the plunger moving to a preselected position, for delaying the operation of said piston device actuating means for a preselected period commencing at each time the plunger reaches said preselected position.

7. In apparatus for automatically feeding sections of elongated stock of a preselected length along a stationary guide to a device for performing a manufacturing operation upon said sections, comprising in combination with said guide: means including a magazine for successively delivering sections of said stock onto said guide; mechanism for feeding consecutively said sections to said device from said magazine, said mechanism including a reciprocable plunger apparatus; control mechanism responsive to preselected reciprocative displacements of said plunger for reciprocatively actuating same; and a timer mechanism operatively connected to said control mechanism and actuatable in response to the plunger moving to a preselected position for delaying the operation of said control mechanism for a preselected period commencing at the time the plunger reaches said preselected position.

8. In apparatus for automatically feeding sections of elongated stock of a preselected length along a stationary guide to a device for performing a manufacturing operation thereupon, comprising in combination with said guide: means including a magazine for holding a plurality of said sections to be delivered consecutively onto said guide; a fluid pressure actuated reciprocative piston device for feeding said sections longitudinally along said guide by successive feed strokes; piston device actuating means responsive to preselected reciprocative displacements of said piston device for reciprocatively actuating said piston device; and a timer actuatable by said piston device and operatively connected to said actuating means for interposing a preselected delay between successive feed strokes of said piston device whereby the device for performing a manufacturing operation upon each section is provided with sufficient time to complete its action thereupon prior to the introduction therein of the next successive section.

9. In apparatus of the class described, the combination comprising: an input rack for holding sections of elongated stock of a preselected length; a stationary guide member, said rack being positioned for delivering said sections consecutively to said stationary guide member; a device for performing a manufacturing operation upon said sections; mechanism for feeding consecutively said sections to said device along said guide member, said mechanism including a reciprocable plunger movable in feed and return strokes for engaging said sections seriatim and urging same into said device; and mechanism for controlling the reciprocation of said plunger including a device for initiating one type of the strokes in response to the movement of the section being acted upon by said device to a preselected position relative to said stationary guide member.

10. In apparatus of the class described, the combination comprising: an input rack for holding sections of elongated stock of a preselected length; a stationary guide member, said rack being positioned for delivering said sections consecutively to said stationary guide member; a device for performing a manufacturing operation upon said sections; mechanism for feeding consecutively said sections to said device along said guide member, said mechanism including a reciprocable plunger movable in feed and return strokes for engaging said objects seriatim and urging same into said device; and mechanism for controlling the reciprocation of said plunger including a device for initiating one type of the strokes thereof in response to the movement of the section being acted upon by said device off of said stationary guide member.

11. In apparatus of the class described, the combination comprising: an input rack for holding sections of elongated stock of a preselected length; a stationary guide member, said rack being positioned for delivering said sections consecutively to said stationary guide member; a device for performing a manufacturing operation upon said sections; mechanism for feeding consecutively said sections to said device along said guide member, said mechanism including a reciprocable plunger movable in feed and return strokes for engaging said objects seriatim and urging same into said device; mechanism for controlling the reciprocation of said plunger including a device for initiating one type of said strokes in response to the movement of the section being acted upon by said device to a preselected position relative to said stationary guide member; a discharge guide member for receiving the sections upon the discharge thereof from said device; a transfer rack positioned adjacent said discharge guide member; mechanism for ejecting consecutively sections from said discharge guide member onto said transfer rack; a second device for performing a manufacturing operation upon said sections, said transfer rack comprising an input magazine for said second device, a stationary guide member associated with the latter rack for guiding said sections to said second device; a second reciprocable plunger movable in feed and return strokes for engaging said objects in said transfer rack and consecutively urging same into engagement with said second device; and mechanism for controlling the reciprocation of said plunger device, including means for initiating one type of said strokes in response to the movement of a section being acted upon by said second device to a predetermined position relative to said second guide member.

12. In apparatus of the class described, the combination comprising: an input tray for holding sections of elongated bar stock of preselected length to be fed consecutively to a device for performing a manufacturing operation thereupon; a stationary guide member associated with said input tray and positioned for receiving consecutively the sections of elongated stock held therein, said guide member acting as a limit stop against transverse movement of the accumulated sections of elongated stock in said rack; said input tray being constructed and arranged for holding elongated objects in parallel relationship and being tilted whereby said objects are movable transversely of the longitudinal axes thereof toward said guide member; a piston device having a reciprocative plunger for engaging one extremity of the section of bar stock which has moved onto said guide member and urging the section longitudinally into engagement with said device, said plunger being reciprocative in feed and return strokes; mechanism for interposing a preselected delay between strokes of said plunger; said device for performing a manufacturing operation being adapted for discharging said sections longitudinally thereof; a discharge guide member positioned for receiving said sections consecutively upon the discharge thereof from said manufacturing operation device; a transfer rack positioned at one side of said discharge guide member for receiving said sections when discharged from the latter; mechanism for automatically ejecting a section of elongated stock from said discharge guide member into said transfer rack in response to the movement of such section to a predetermined position relative to said discharge guide member, said ejecting mechanism moving the section transversely of the longitudinal axis thereof onto said rack; a second device for performing a manufacturing operation upon the sections of elongated bar stock; said transfer rack comprising an input rack for said second device and upon which the sections are movable transversely of the longitudinal axes thereof; a second guide member positioned for receiving the sections in said transfer rack and holding same for longitudinal feeding to said second device, said second guide member acting as a limit stop against transverse movement of the sections accumulated in said transfer rack; a second piston device having a reciprocative plunger movable in feed and return strokes and positioned for engaging consecutively one extremity of a section on said second guide member and urging same longitudinally into said second device for performing a manufacturing operation; and mechanism for interposing a preselected delay between strokes of said second plunger.

13. In apparatus of the class described, the combination comprising: an input tray for holding sections of elongated bar stock of preselected length to be fed consecutively to a device for performing a manufacturing operation thereupon; a stationary guide member associated with said input tray and positioned for receiving consecutively the sections of elongated stock held therein, said guide member acting as a limit stop for the accumulated sections of elongated stock in said tray; said input tray being constructed and arranged for holding the elongated objects in parallel relationship and being tilted whereby said objects are movable transversely of the longitudinal axes thereof toward said guide member; a piston device having a reciprocative plunger for engaging one extremity of a section of bar stock on said guide member and urging same longitudinally into engagement with said device, said plunger being reciprocative in feed and return strokes for consecutively urging the sections in said input tray into engagement with said device; mechanism for interposing a preselected delay between the feed strokes of said plunger; said device for performing a manufacturing operation being adapted for discharging said sections longitudinally thereof; a discharge guide member positioned for receiving said sections consecutively upon the discharge thereof from said manufacturing operation device; a transfer rack positioned at one side of said discharge guide member for receiving said sections when discharged from the latter; mechanism for automatically ejecting the section of elongated stock from said discharge guide member into said transfer rack in response to the movement of such section to a predetermined position relative to said discharge guide member, said ejecting mechanism moving the object transversely of the longitudinal axis thereof; a second device for performing a manufacturing operation upon the sections of elongated bar stock; said transfer rack comprising an input rack for said second device; a second guide member positioned for receiving the sections in said transfer rack and holding same for longitudinal feeding to said second device, said second guide member acting as a limit stop for the sections accumulated in said transfer rack; a second piston device having a reciprocative plunger movable in feed and return strokes and positioned for engaging consecutively one extremity of a section on said second guide member and urging same longitudinally into said second device for performing a manufacturing operation; mechanism for interposing a preselected delay between the feed strokes of said second plunger; a second discharge guide member for receiving sections discharged longitudinally by said second manufacturing operation device; a storage rack positioned to one side of said second discharge member; and an ejector mechanism automatically operable in response to a section moving to a preselected position upon said second discharge guide member for urging the section transversely out of said guide member and into said storage rack.

14. In apparatus of the class described, the combination comprising: an input rack for holding sections of elongated stock of a preselected length; a stationary guide member mounted adjacent said input rack; said rack being constructed and arranged for holding a plurality of the sections of bar stock in parallel relationship and being positioned for delivering said sections consecutively to said stationary guide member, the latter acting as a limit stop for the sections accumulated in said rack; a centerless grinder having parts cooperating to urge a section acted thereupon in a longitudinal direction; mechanism for feeding the sections longitudinally thereof and consecutively to said centerless grinder along said guide member, said mechanism including a reciprocative plunger for engaging said sections seriatim and urging same longitudinally into said grinder, the plunger being withdrawn when the grinder engages a section; mechanism for controlling the reciprocation of the plunger including means for initiating strokes thereof in response to the movement of the section being acted upon by the grinder to a preselected position relative to said stationary guide member; a discharge guide member for receiving the sections upon discharge thereof from said grinder; a transfer rack positioned at one side of said discharge guide member; an ejector mechanism for ejecting each section upon said discharge guide member transversely thereof onto said transfer rack, said ejector mechanism being operative in response to a section moving to a preselected position upon said discharge guide member, a second centerless grinder; said transfer rack comprising an input tray for said latter grinder and upon which tray said sections move transversely; a stationary guide member associated with the latter rack and positioned for receiving sections therein consecutively and for guiding same to said second grinder, said second stationary guide member acting as a limit stop for the sections accumulated in said transfer rack; mechanism for feeding consecutively the sections to said second grinder along said second guide member, said mechanism including a reciprocative plunger for engaging the sections seriatim and urging same longitudinally into said second grinder; and mechanism for controlling the reciprocation of said second plunger including means for initiating strokes thereof in response to the movement of a section to a preselected position relative to said second stationary guide member, said second reciprocative plunger being positioned for urging the sections in a direction opposite to that of the first reciprocative plunger.

CARL J. MURRAY.
WALLACE K. LOWE.

REFERENCES CITED

The following references are of record in the file of this patent:

UNITED STATES PATENTS

| Number | Name | Date |
|---|---|---|
| 284,700 | Williams | Sept. 11, 1883 |
| 1,670,717 | Einstein | May 22, 1928 |
| 1,850,373 | Booth | Mar. 22, 1932 |
| 2,059,895 | Norton et al. | Nov. 3, 1936 |
| 2,086,052 | Silven | July 6, 1937 |
| 2,241,351 | Indge et al. | May 6, 1941 |
| 2,260,843 | Strong | Oct. 28, 1941 |